United States Patent
Hanada

(10) Patent No.: US 12,026,792 B2
(45) Date of Patent: Jul. 2, 2024

(54) ENERGY BALANCE ADJUSTMENT CONTROL METHOD AND ADJUSTMENT CONTROL DEVICE

(71) Applicant: TMEIC CORPORATION, Tokyo (JP)

(72) Inventor: Masato Hanada, Tokyo (JP)

(73) Assignee: TMEIC CORPORATION, Tokyo (JP)

( * ) Notice: Subject to any disclaimer, the term of this patent is extended or adjusted under 35 U.S.C. 154(b) by 77 days.

(21) Appl. No.: 17/436,658

(22) PCT Filed: Jul. 8, 2019

(86) PCT No.: PCT/JP2019/026949
§ 371 (c)(1),
(2) Date: Sep. 7, 2021

(87) PCT Pub. No.: WO2021/005675
PCT Pub. Date: Jan. 14, 2021

(65) Prior Publication Data
US 2022/0188945 A1    Jun. 16, 2022

(51) Int. Cl.
*G06Q 50/06* (2012.01)
*H02J 3/14* (2006.01)
*H02J 3/46* (2006.01)

(52) U.S. Cl.
CPC .............. *G06Q 50/06* (2013.01); *H02J 3/144* (2020.01); *H02J 3/46* (2013.01)

(58) Field of Classification Search
CPC ............. G06Q 50/06; H02J 3/144; H02J 3/46
See application file for complete search history.

(56) References Cited

U.S. PATENT DOCUMENTS

| 2014/0222225 A1* | 8/2014 | Rouse | ....... H02J 3/14 700/291 |
| 2015/0213387 A1 | 7/2015 | Sankar et al. | |
| 2019/0074693 A1* | 3/2019 | Kudo | ....... H02J 3/003 |

FOREIGN PATENT DOCUMENTS

| JP | 2014-117018 A | 6/2014 |
| JP | 2016-135040 A | 7/2016 |

(Continued)

OTHER PUBLICATIONS

Vagelis Vossos, Review of DC Power Distribution in Buildings: A Technology and Market Assessment, pp. 5-8 (Year: 2017).*

(Continued)

*Primary Examiner* — Ibrahim N El-Bathy
(74) *Attorney, Agent, or Firm* — XSENSUS LLP

(57) ABSTRACT

According to an embodiment of the invention, an energy balance adjustment control method is provided and includes a process of receiving an output curtailment instruction for a distributed power source, a process of requesting a load adjustment to a consumer according to the receiving of the output curtailment instruction, a process of receiving a reply to the request from the consumer, and a process based on the reply including notifying the distributed power source of an avoidance of the output curtailment instruction in the case where the load adjustment is possible or notifying the distributed power source of the output curtailment instruction in the case where the load adjustment is impossible. Thus, an energy balance adjustment control method and an adjustment control device are provided in which the occurrence of output curtailment can be suppressed.

12 Claims, 3 Drawing Sheets

(56) References Cited

FOREIGN PATENT DOCUMENTS

JP          6343372 B1    6/2018
WO     2012/066651 A1    5/2012

OTHER PUBLICATIONS

Extended European search report dated Dec. 23, 2022, in corresponding European patent Application No. 19912200.3, 9 pages.
Office Action dated Jul. 5, 2022 in Australian Patent Application No. 2019427992, 5 pages.
Examination Report dated Aug. 11, 2023 in Australian Patent Application No. 2022209228, 3 pages.
International Search Report and Written Opinion dated Sep. 10, 2019, received for PCT Application PCT/JP2019/026949, Filed on Jul. 8, 2019, 9 pages including English Translation.
International Search Report and Written Opinion mailed on Sep. 10, 2019, received for PCT Application PCT/JP2019/026949, Filed on Jul. 8, 2019, 9 pages including English Translation.
Office Action issued Mar. 7, 2024, in European Patent Application No. 19912200.3.
Examination Report issued Aug. 11, 2023 in Australian Patent Application No. 2022209228, 3 pages.

* cited by examiner

ENERGY BALANCE ADJUSTMENT CONTROL METHOD AND ADJUSTMENT CONTROL DEVICE

CROSS-REFERENCE TO RELATED APPLICATION

The present application is based on PCT filing PCT/JP2019/026949, filed Jul. 8, 2019, the entire contents of which are incorporated herein by reference.

TECHNICAL FIELD

Embodiments of the invention relate to an energy balance adjustment control method and an adjustment control device.

BACKGROUND ART

To avoid the unbalance between demand and supply due to the large-scale introduction of distributed power sources utilizing renewable energy, there are cases where output curtailment is performed to curtail the output of the distributed power sources. When such output curtailment is performed, the electrical power that is generatable by renewable energy is undesirably wasted; and the renewable energy undesirably can no longer be utilized effectively. Also, the revenue due to selling electric power of the business owners of the distributed power sources undesirably decreases.

Therefore, it is desirable to suppress the occurrence of output curtailment in an electric power system connected to distributed power sources utilizing renewable energy.

PRIOR ART DOCUMENTS

Patent Literature

[PTL 1]
Japanese Patent No. 6343372

SUMMARY OF INVENTION

Problem to be Solved by the Invention

An embodiment of the invention provides an energy balance adjustment control method and an adjustment control device in which the occurrence of output curtailment can be suppressed.

Means for Solving the Problem

According to an embodiment of the invention, an energy balance adjustment control method is provided and includes a process of receiving an output curtailment instruction for a distributed power source, a process of requesting a load adjustment to a consumer according to the receiving of the output curtailment instruction, a process of receiving a reply to the request from the consumer, and a process based on the reply including notifying the distributed power source of an avoidance of the output curtailment instruction in the case where the load adjustment is possible or notifying the distributed power source of the output curtailment instruction in the case where the load adjustment is impossible.

Effects of the Invention

According to an embodiment of the invention, an energy balance adjustment control method and an adjustment control device are provided in which the occurrence of output curtailment can be suppressed.

MODES FOR CARRYING OUT THE INVENTION

Figure 1:
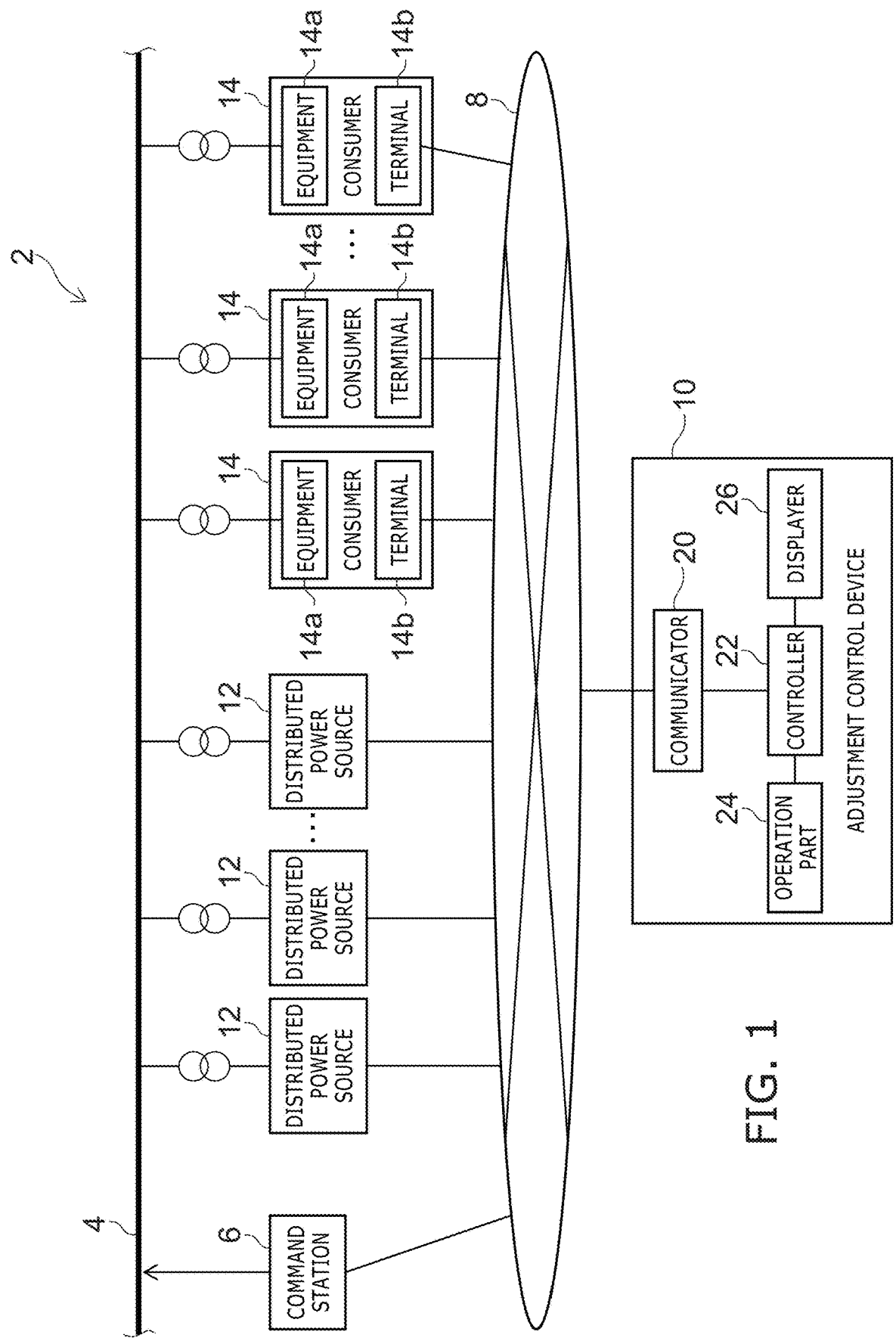
FIG. 1 is a block diagram schematically illustrating a distributed power source system according to an embodiment.

Embodiments will now be described with reference to the drawings.

The drawings are schematic and conceptual; and the relationships between the thicknesses and widths of portions, the proportions of sizes among portions, etc., are not necessarily the same as the actual values. The dimensions and/or the proportions may be illustrated differently among drawings even in the case where the same portion is illustrated.

In the specification and drawings, components similar to those described previously or illustrated in an antecedent drawing are marked with the same reference numerals; and a detailed description is omitted as appropriate.

FIG. 1 is a block diagram schematically illustrating a distributed power source system according to an embodiment.

As illustrated in FIG. 1, the distributed power source system 2 includes an electric power system 4, a command station 6, a network 8, an adjustment control device 10, a distributed power source 12, and a consumer 14.

The distributed power source system 2 includes, for example, multiple distributed power sources 12 and multiple consumers 14. However, multiple distributed power sources 12 and multiple consumers 14 may not always be provided. It is sufficient for the distributed power source system 2 to include at least one distributed power source 12 and at least one consumer 14.

The electrical power of the electric power system 4 is, for example, alternating current power. The command station 6 operates the electric power system 4. The command station 6 is connected to the network 8. The network 8 may be a public line such as the Internet, etc., or may be a dedicated line constructed to be dedicated to the distributed power source system 2.

Based on the season, the weather, the time, etc., the command station 6 predicts the demand of the electrical power of the electric power system 4 and transmits commands based on the prediction to various power plants such as the distributed power source 12, etc., via the network 8. For example, the command station 6 predicts the electrical power demand of the next day, prepares a power generation plan, and transmits commands based on the power generation plan to the distributed power source 12, etc. Also, the command station 6 monitors the condition of the electric power system 4 in real time and transmits commands corresponding to the condition of the electric power system 4 to the various power plants such as the distributed power source 12, etc., via the network 8.

The power plants such as the distributed power source 12, etc., generate power based on the commands from the command station 6. Thereby, the command station 6 maintains the balance between demand and supply of the electric power system 4. In other words, the command station 6 maintains the frequency of the alternating current power of the electric power system 4 within a prescribed range. The command station 6 is, for example, a central load dispatching office supervising the system operation of the entire system, a system power supply control station operating the main system, a general control station operating a local system, etc.

The distributed power source 12 is connected to the electric power system 4 and the network 8. The distributed power source 12 generates power based on a command input from the command station 6 via the network 8 and is connected to the electric power system 4 by supplying the generated electrical power to the electric power system 4.

The distributed power source 12 includes, for example, a solar panel and a power conversion device (a power conditioner) converting the direct current power output from the solar panel into alternating current power responding to the electric power system 4. The distributed power source 12 is, for example, a solar power plant. The distributed power source 12 may further include, for example, a main site controller which integratedly controls multiple power conversion devices and realizes the maximization of the output, etc.

The distributed power source 12 is not limited to a solar power plant and may be, for example, a power plant utilizing other renewable energy such as wind power, wave power, tidal power, moving water, geothermal energy, biomass, etc. The distributed power source 12 may be any distributed power source utilizing renewable energy.

The consumer 14 includes equipment 14a connected to the electric power system 4, and a terminal 14b connected to the network 8. The consumer 14 operates the equipment 14a based on the alternating current power supplied from the electric power system 4. The terminal 14b is, for example, a personal computer, a server, etc. The terminal 14b may be, for example, a portable terminal such as a tablet terminal, etc.

The consumer 14 is, for example, a plant. The consumer 14 may be, for example, a pumped-storage power plant that can store excess electrical power temporarily, etc. The consumer 14 may be any facility connected to the electric power system 4 and including the equipment 14a operating based on the electrical power supplied from the electric power system 4. However, for example, it is favorable for the consumer 14 to be a large high-voltage consumer or a small high-voltage consumer having a larger contract demand than a low-voltage consumer such as an ordinary household or the like.

The adjustment control device 10 performs an energy balance adjustment control to adjust the balance between the electrical power supply from the distributed power source 12 and the electrical power demand at the consumer 14 when the output curtailment instruction for the distributed power source 12 is output from the command station 6 in the distributed power source system 2.

The adjustment control device 10 includes a communicator 20, a controller 22, an operation part 24, and a displayer 26. The adjustment control device 10 is, for example, a personal computer, a server, etc. The adjustment control device 10 may be, for example, a portable terminal such as a tablet terminal, etc.

The communicator 20 communicates via the network 8. The communication between the communicator 20 and the network 8 may be only wired communication, or may partially include wireless communication via a relay device, etc. The communicator 20 may be any communication device conforming to the communication standard of the network 8.

In the network 8, the line between the adjustment control device 10 and the consumer 14 may be different from the line between the adjustment control device 10 and the distributed power source 12 and the line between the command station 6 and the distributed power source 12. The network 8 may be configured using multiple lines. For example, the network 8 may be configured by mixing public lines and dedicated lines, etc.

The controller 22 is connected to the communicator 20. The controller 22 controls the communication by the communicator 20. The operation part 24 is connected to the controller 22. The operation part 24 accepts an operation instruction input from an operator or the like and inputs the accepted operation instruction to the controller 22. The operation part 24 may be, for example, a well-known input device such as a keyboard, a mouse, a touch sensor, etc.

The displayer 26 is connected to the controller 22. The displayer 26 displays various operation screens, etc., in a screen based on the control of the controller 22. The displayer 26 may be, for example, a well-known display device such as a liquid crystal display, etc.

For example, the controller 22 performs the energy balance adjustment control by storing an adjustment control program for performing the energy balance adjustment control and by sequentially processing the adjustment control program.

For example, the controller 22 displays the various operation screens in the displayer 26 based on the execution of the adjustment control program. The operator of the adjustment control device 10 or the like operates the operation part 24 based on the content of the operation screen displayed in the displayer 26 and inputs a prescribed operation instruction responding to the content of the operation screens. The controller 22 performs processing responding to the operation instruction input from the operation part 24. Thereby, the controller 22 performs the energy balance adjustment control based on the adjustment control program.

For example, the controller 22 may be capable of performing the energy balance adjustment control by automatically performing the processing based on the input from the communicator 20 without needing the input of the operation instruction from the operator or the like. In such a case, the operation part 24 and the displayer 26 may be omitted from the adjustment control device 10. The operation part 24 and the displayer 26 are provided as necessary and are omissible. It is sufficient for the adjustment control device 10 to include at least the communicator 20 and the controller 22.

Figure 2:
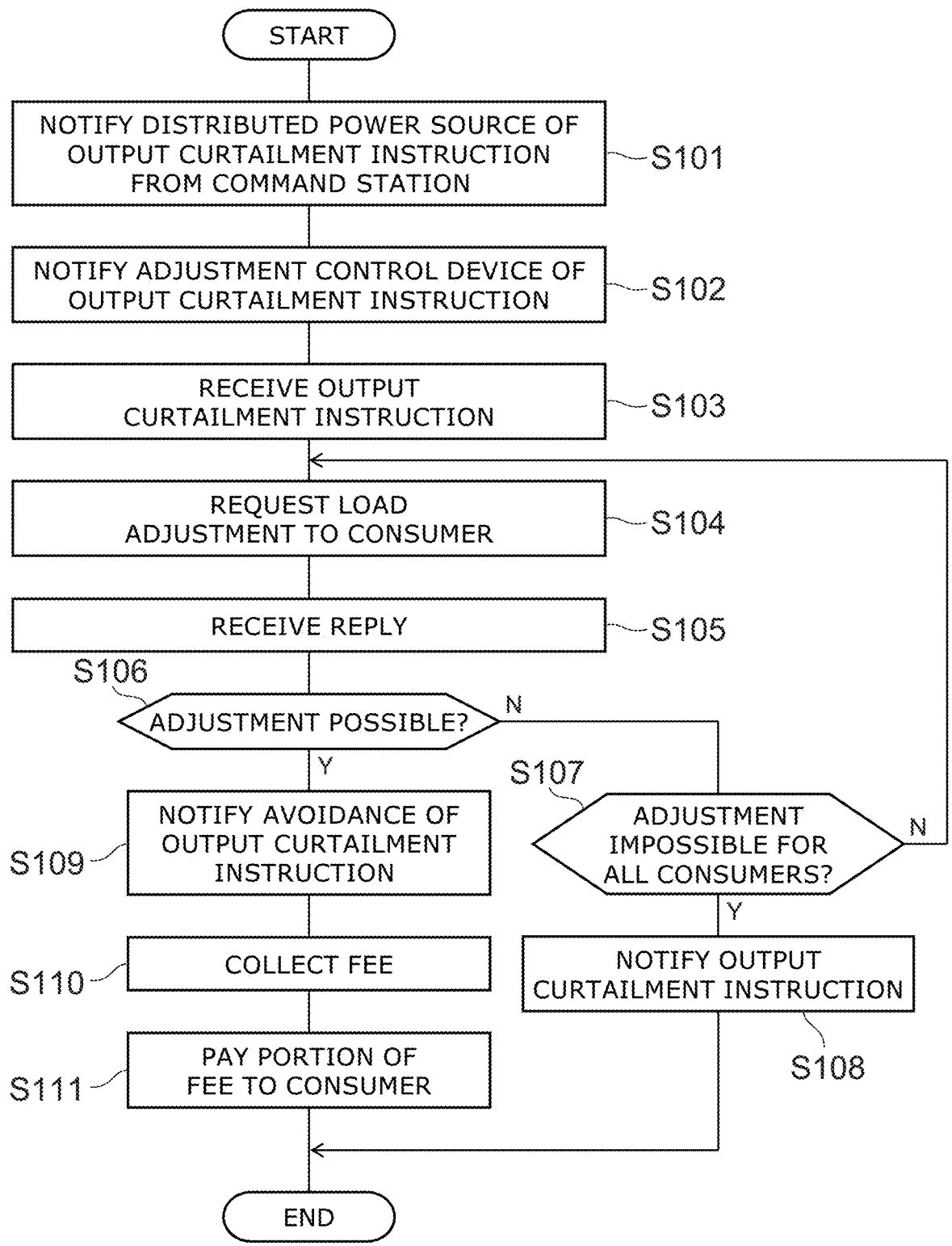
FIG. 2 is a flowchart schematically illustrating an example of the energy balance adjustment control method by the adjustment control device.

FIG. 2 is a flowchart schematically illustrating an example of the energy balance adjustment control method by the adjustment control device.

An example of the energy balance adjustment control by the adjustment control device 10 will now be described with reference to FIG. 2.

When the supply amount of the electrical power exceeds the demand, the command station 6 notifies the distributed power source 12 of an output curtailment instruction (step S101 of FIG. 2). When multiple distributed power sources 12 exist, the command station 6 notifies any of the multiple distributed power sources 12 of the output curtailment instruction by considering the balance of the demand and the supply amount of the electrical power. The output curtailment instruction may be the stop of the output, a limit of the active power output, etc. Also, for example, the distributed power source 12 is notified of the output curtailment instruction as a command value curtailing the output from the command station 6 to the distributed power source 12. Also, the timing of the command station 6 notifying the distributed power source 12 of the output curtailment instruction may be such that the notification is in the power generation plan of the previous day or the notification is according to the condition of the electric power system 4 based on real-time monitoring.

After receiving the output curtailment instruction from the command station 6, the distributed power source 12 that receives the notification of the output curtailment instruction notifies the adjustment control device 10 of the output curtailment instruction (step S102 of FIG. 2). In other words, the distributed power source 12 transfers the received output curtailment instruction to the adjustment control device 10.

The controller 22 of the adjustment control device 10 receives the output curtailment instruction for the distributed power source 12 from the distributed power source 12 via the communicator 20 (step S103 of FIG. 2). Thus, a process of receiving the output curtailment instruction includes a process of receiving, from the distributed power source 12, the notification of the output curtailment instruction from the command station 6 operating the electric power system 4 to the distributed power source 12.

According to the reception of the output curtailment instruction, the controller 22 requests a load adjustment to the consumer 14 via the communicator 20 (step S104 of FIG. 2). For example, the controller 22 requests the load adjustment to the terminal 14b of the consumer 14 via the communicator 20 and the network 8.

The load adjustment is the increase of the electrical power demand of the electric power system 4 by increasing the power consumption of the consumer 14 by operating the equipment 14a or by increasing the operation amount of the equipment 14a in the consumer 14. The request of the load adjustment includes, for example, information of the electrical power amount to be adjusted, information of the time that the adjustment is to be performed, etc.

When receiving the output curtailment instruction, for example, the controller 22 notifies the operator of the adjustment control device 10 of the reception of the output curtailment instruction by displaying the content of the received output curtailment instruction in the displayer 26. The content of the output curtailment instruction includes, for example, information of the distributed power source 12 that received the output curtailment instruction, information of the electrical power amount of the curtailed output, etc. The operator of the adjustment control device 10 requests the load adjustment to the consumer 14 by referring to the content of the output curtailment instruction displayed in the displayer 26, operating the operation part 24, and inputting a prescribed operation instruction to the controller 22.

For example, based on information of the electrical power amount of the curtailed output, the operator of the adjustment control device 10 selects the consumer 14 from among the multiple consumers 14 capable of responding and requests the load adjustment to the consumer 14. For example, when the electrical power amount to be curtailed is large and the electrical power amount to be curtailed cannot be met by one consumer 14, etc., the load adjustment may be requested simultaneously to multiple consumers 14.

For example, in the case where a dedicated application responding to the energy balance adjustment control by the adjustment control device 10 or the like is preinstalled in the terminal 14b of the consumer 14, the load adjustment is requested as a prescribed message which is predetermined. In the case where a dedicated application or the like is not installed, etc., the load adjustment is requested by, for example, electronic mail, etc. The format of requesting the load adjustment to the terminal 14b of the consumer 14 may be any format capable of requesting the load adjustment to the consumer 14.

Also, for example, the controller 22 may determine the consumer 14 to which the load adjustment is requested based on the electrical power amount of the curtailed output, a predetermined priority order of the consumer 14, etc. In other words, the controller 22 may request the load adjustment to the consumer 14 automatically according to the reception of the output curtailment instruction without going through the operator, etc.

When receiving the request of the load adjustment from the adjustment control device 10, the consumer 14 replies to the adjustment control device 10 whether or not the consumer 14 will cooperate with the load adjustment. For example, the operator of the consumer 14 refers to the request of the load adjustment via the terminal 14b, determines whether or not the consumer 14 will cooperate based on the electrical power amount to be adjusted, the time that the adjustment is to be performed, etc., and sends a reply from the terminal 14b including information of whether or not the consumer 14 will cooperate with the adjustment control device 10. For example, information of the adjustable electrical power amount may be included in the reply.

The controller 22 of the adjustment control device 10 receives the reply to the request from the consumer 14 via the communicator 20 (step S105 of FIG. 2).

Based on the reply from the consumer 14, the controller 22 determines whether or not the load adjustment is possible (step S106 of FIG. 2). In other words, the controller 22 determines whether or not the consumer 14 replied to cooperate with the load adjustment.

For example, the controller 22 determines that the load adjustment is possible when a reply of the cooperation from the consumer 14 is received and the adjustable electrical power amount of the consumer 14 is greater than the curtailed electrical power amount instructed by the output curtailment instruction.

For example, the controller 22 determines that the load adjustment is impossible when receiving a reply that the cooperation from the consumer 14 cannot be provided or when the adjustable electrical power amount of the consumer 14 does not satisfy the curtailed electrical power amount instructed by the output curtailment instruction.

When the load adjustment by the consumer 14 from which the reply is received is impossible, the controller 22 determines whether or not the load adjustment is impossible for all consumers 14 of the multiple consumers 14 (step S107 of FIG. 2).

When a consumer 14 to which the load adjustment has not been requested remains, the controller 22 returns to the processing of step S104 and requests the load adjustment to another consumer 14 to which the load adjustment has not yet been requested.

The controller 22 may cause the operator or the like to determine whether or not the load adjustment is possible by displaying the reply received from the consumer 14 as-is in the displayer 26. Similarly, the operator or the like may be caused to determine whether or not to request the load adjustment to another consumer 14.

When it is determined that the load adjustment is impossible for all of the consumers 14, the controller 22 notifies the distributed power source 12 of the output curtailment instruction via the communicator 20 (step S108 of FIG. 2). In such a case, the output curtailment of the distributed power source 12 is performed based on the notification of the output curtailment instruction from the command station 6.

On the other hand, when it is determined in step S106 that the load adjustment is possible, the controller 22 notifies the distributed power source 12 of the avoidance of the output curtailment instruction via the communicator 20 (step S109 of FIG. 2).

This is not limited to the case where the adjustable electrical power amount of one consumer 14 is greater than the curtailed electrical power amount instructed by the output curtailment instruction; for example, it may be determined that the load adjustment is possible when the total of the adjustable electrical power amounts of multiple consumers 14 is greater than the curtailed electrical power amount instructed by the output curtailment instruction.

Also, for example, there is also a possibility that multiple distributed power sources 12 may receive output curtailment instructions from the command station 6. In such a case, for example, it may be determined that the load adjustment is possible when the total of the adjustable electrical power amounts of the multiple consumers 14 is greater than the total of the electrical power amount to be curtailed by the multiple distributed power sources 12. When the multiple distributed power sources 12 receive the output curtailment instructions, the processing recited above may be performed individually one distributed power source 12 at a time.

When the load adjustment is possible, the controller 22 also notifies the command station 6 of the avoidance of the output curtailment instruction. The notification of the avoidance of the output curtailment instruction to the distributed power source 12 may be notified directly to the distributed power source 12 from the controller 22; or may be notified the output curtailment instruction to the distributed power source 12 from the command station 6 after the controller 22 notified the avoidance of the output curtailment instruction to the command station 6.

When the output curtailment instruction is avoided, the distributed power source 12 operates even in the period of the output curtailment instruction; and electrical power is supplied from the distributed power source 12 to the electric power system 4. In other words, electric power is sold by the distributed power source 12. Thereby, the undesirable waste of renewable energy such as sunlight, etc., can be suppressed.

Then, the consumer 14 that provided the reply of being capable of adjustment operates the equipment 14a or increases the operation amount of the equipment 14a, and consumes the generated amount of electrical power. Thereby, the balance between demand and supply of the electrical power of the electric power system 4 can be maintained even when the distributed power source 12 is operated.

In such a case, for example, the business owner of the adjustment control device 10 prepares a report summarizing the power generation data (the power generation amount) of the distributed power source 12 and the power reception data (the power consumption amount) of the consumer 14 in the period of the output curtailment instruction, and submits the report to the command station 6. More specifically, the period of the output curtailment instruction is the period in which the curtailment of the output was instructed to the distributed power source 12 by the output curtailment instruction.

In the case where the output curtailment instruction is avoided, the business owner of the adjustment control device 10 collects, from the business owner of the distributed power source 12, a fee corresponding to a portion of the revenue of the distributed power source 12 due to selling electric power in the period of the output curtailment instruction (step S110 of FIG. 2). In other words, the business owner of the adjustment control device 10 collects, as a remuneration from the business owner of the distributed power source 12, a portion of the revenue for the period in which the revenue originally would not have been obtained.

After collecting the fee corresponding to the portion of the revenue from the business owner of the distributed power source 12, the business owner of the adjustment control device 10 pays a portion of the fee as a cooperation fee to the consumer 14 that provided the reply of being capable of adjustment (step S110 of FIG. 2). For example, the business owner of the adjustment control device 10 pays, as the cooperation fee to the consumer 14 that provided the reply of being capable of adjustment, an amount corresponding to the electricity cost necessary for the load adjustment in the period of the output curtailment instruction.

In a feed-in tariff system (Feed-in Tariff: FIT) of renewable energy, the revenue due to selling electric power is, for example, 40 yen/kWh. In such a case, for example, the business owner of the adjustment control device 10 collects, as the remuneration from the business owner of the distributed power source 12, a fee corresponding to 20 yen/kWh. Thereby, the business owner of the distributed power source 12 can obtain a revenue having a unit price of 20 yen/kWh in the period in which the revenue originally would not have been obtained.

Then, from the fee corresponding to 20 yen/kWh, the business owner of the adjustment control device 10 pays, as the cooperation fee to the consumer 14, a fee corresponding to 10 yen/kWh. Thereby, the business owner of the adjustment control device 10 can obtain, as a remuneration for the energy balance adjustment control, a fee corresponding to the remaining 10 yen/kWh.

The electric power usage fee of a plant, etc., is, for example, 10 yen/kWh. Accordingly, at the consumer 14 that performed the load adjustment, the cooperation fee of 10 yen/kWh is obtained from the business owner of the adjustment control device 10 after paying the electrical power fee of 10 yen/kWh to the electric company; thereby, the equipment 14a can be operated substantially without paying the electrical power fee.

For example, when the multiple consumers 14 perform the load adjustment, it is sufficient to pay cooperation fees according to the proportion of the adjustment amount of the load. For example, in the case where the proportion of the adjustment amount of the load for two consumers 14 is 50% each, it is sufficient to pay a cooperation fee of 5 yen/kWh to each consumer 14. In such a case as well, each consumer 14 can operate the equipment 14a while substantially paying a reduced electrical power fee.

Thus, in the adjustment control device 10 according to the embodiment, the occurrence of output curtailment can be suppressed by performing energy balance adjustment control. Thereby, the undesirable waste of renewable energy by output curtailment can be suppressed while maintaining the balance between demand and supply of the electrical power of the electric power system 4.

Also, when the output curtailment instruction is avoided, a fee that corresponds to a portion of the revenue of the distributed power source 12 due to selling electric power in the period of the output curtailment instruction is collected from the business owner of the distributed power source 12; and a portion of the fee is paid to the consumer 14. Thereby, a profit from electric power selling can be obtained by the business owner of the adjustment control device 10 and the business owner of the distributed power source 12. Also, the consumer 14 can operate the equipment 14a while reducing the electrical power fee. A service can be provided that is profitable for each of the business owner of the adjustment control device 10, the business owner of the distributed power source 12, and the consumer 14.

In the example recited above, it is determined that the load adjustment is possible when the adjustable electrical power amount is greater than the electrical power amount to be curtailed. This is not limited thereto; for example, it may be determined that the load adjustment is possible when there is a small adjustable electrical power amount; and the distributed power source 12 may output electrical power of only the adjustable electrical power amount due to the notification of the avoidance of the output curtailment instruction to the command station 6 and the distributed power source 12.

Figure 3:
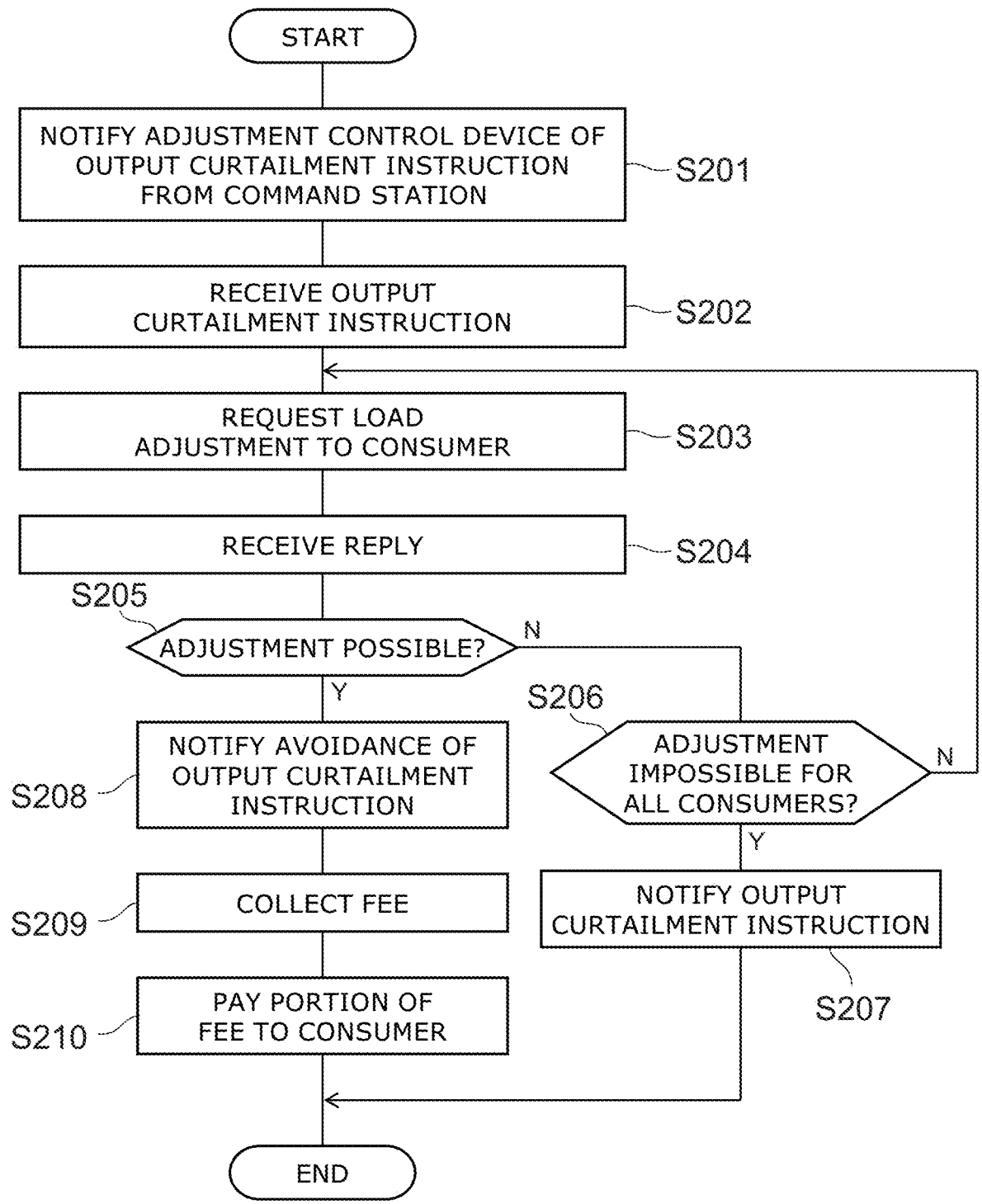
FIG. 3 is a flowchart schematically illustrating a modification of the energy balance adjustment control method by the adjustment control device.

FIG. 3 is a flowchart schematically illustrating a modification of the energy balance adjustment control method by the adjustment control device.

In the example as illustrated in FIG. 3, the command station 6 notifies the adjustment control device 10 of the output curtailment instruction when the supply amount of the electrical power exceeds the demand (step S201 of FIG. 3). The controller 22 of the adjustment control device 10 receives the output curtailment instruction for the distributed power source 12 from the command station 6 via the communicator 20 (step S202 of FIG. 3). Steps S203 to S210 of FIG. 3 are substantially the same as steps S104 to S111 described in reference to FIG. 2; and a detailed description is therefore omitted hereinbelow.

Thus, the process of receiving the output curtailment instruction may be a process of receiving the output curtailment instruction from the command station 6 operating the electric power system 4. The output curtailment instruction may be received directly from the command station 6, or may be received via the distributed power source 12.

When the output curtailment instruction is received directly from the command station 6, the adjustment control device 10 may be notified by the command station 6 of multiple output curtailment instructions responding respectively to the multiple distributed power sources 12, or the adjustment control device 10 may be notified by the command station 6 of the output curtailments for the multiple distributed power sources 12 as one summarized output curtailment instruction.

As described above, an energy balance adjustment control method according to the embodiment includes:
  a process of receiving an output curtailment instruction for the distributed power source 12 (e.g., step S103 of FIG. 2 and step S202 of FIG. 3);
  a process of requesting a load adjustment to the consumer 14 according to the receiving of the output curtailment instruction (e.g., step S104 of FIG. 2 and step S203 of FIG. 3);
  a process of receiving a reply to the request from the consumer 14 (e.g., step S105 of FIG. 2 and step S204 of FIG. 3); and
  a process which is based on the reply and includes notifying the distributed power source 12 of an avoidance of the output curtailment instruction in the case where the load adjustment is possible (e.g., step S109 of FIG. 2 and step S208 of FIG. 3), or notifying the distributed power source 12 of the output curtailment instruction in the case where the load adjustment is impossible (e.g., step S108 of FIG. 2 and step S207 of FIG. 3).

The energy balance adjustment control method according to the embodiment further includes:
  a process of collecting a fee from the business owner of the distributed power source 12 in the case where the output curtailment instruction is avoided, in which the fee corresponds to a portion of a revenue of the distributed power source 12 due to selling electric power in a period of the output curtailment instruction (e.g., step S110 of FIG. 2 and step S209 of FIG. 3); and
  a process of paying a portion of the fee to the consumer 14 (e.g., step S111 of FIG. 2 and step S210 of FIG. 3).

The process of receiving the output curtailment instruction for the distributed power source 12 is not limited to the process of the controller 22 of the adjustment control device 10 receiving the output curtailment instruction, and may include, for example, a process of an operator of the adjustment control device 10 or the like receiving the output curtailment instruction by telephone contact, etc.

The process of requesting the load adjustment to the consumer 14 is not limited to the process of the controller 22 of the adjustment control device 10 requesting and may include, for example, a process of the operator of the adjustment control device 10 or the like requesting the load adjustment to the operator of the consumer 14 or the like by telephone contact, etc.

The process of receiving the reply is not limited to the process of the controller 22 of the adjustment control device 10 receiving the reply and may include, for example, a process of the operator of the adjustment control device 10 or the like receiving the reply from the operator of the consumer 14 or the like by telephone contact, etc.

The process of notifying the distributed power source 12 of the avoidance of the output curtailment instruction and the process of notifying the distributed power source 12 of the output curtailment instruction are not limited to the processes of the controller 22 of the adjustment control device 10 notifying the distributed power source 12 and may include, for example, a process of the operator of the adjustment control device 10 or the like notifying an operator of the distributed power source 12 or the like by telephone contact, etc.

Hereinabove, embodiments of the invention are described with reference to specific examples. However, the embodiments of the invention are not limited to these specific examples. For example, one skilled in the art may similarly practice the invention by appropriately selecting specific configurations of components included in the adjustment control device 10 from known art; and such practice is within the scope of the invention to the extent that similar effects can be obtained.

Also, combinations of any two or more components of the specific examples within the extent of technical feasibility also are within the scope of the invention to the extent that the spirit of the invention is included.

Also, all adjustment control devices practicable by an appropriate design modification by one skilled in the art based on the adjustment control device 10 described above as embodiments of the invention also are within the scope of the invention to the extent that the spirit of the invention is included.

Also, various modifications and alterations within the spirit of the invention will be readily apparent to those skilled in the art; and all such modifications and alterations also should be seen as being within the scope of the invention.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the invention.

The invention claimed is:

1. An adjustment control device, comprising:
a communication circuit configured to communicate with a distributed power source system via a network, the distributed power source system including an electric power system, a command station, a distributed power source, and a terminal of a consumer, the distributed power source generating an electric power utilizing renewable energy, the command station controlling an output of the distributed power system; and
a control circuit configured to control communication by the communication circuit, wherein
the control circuit is configured to receive an output curtailment instruction for the distributed power source via the communication circuit,
the control circuit is configured to automatically send a request load adjustment to the terminal of the consumer via the communication circuit in response to the output curtailment instruction without the need of an operator, the request of load adjustment including information of electrical power amount to be adjusted in association with the output curtailment instruction,
the control circuit is configured to receive a reply to the request from the terminal of the consumer via the communication circuit,
the control circuit is configured to notify to the distributed power source of an avoidance of the output curtailment instruction via the communication circuit in a case where the load adjustment is determined to be possible based on the reply,
the control circuit is configured to notify to the distributed power source of the output curtailment instruction via the communication circuit in a case where the load adjustment is not determined to be possible,
wherein the distributed power source is configured to perform an output curtailment in a case where the distributed power source receives the output curtailment instruction from the control circuit,
wherein the distributed power source is configured to keep generating the electric power utilizing renewable energy in a case where the distributed power source receives the avoidance of the output curtailment instruction from the control circuit,
wherein the distributed power source system includes a plurality of consumer terminals that includes at least a first consumer terminal and a second consumer terminal,
wherein the control circuit is configured to send the request of load adjustment to the first consumer terminal via the communication circuit in response to the output curtailment instruction,
wherein the control circuit is configured to receive a first reply to the request from the first consumer terminal via the communication circuit,
wherein the control circuit is configured to send the request of the load adjustment to the second consumer terminal via the communication circuit, under a condition that an adjustable electrical power amount of the first consumer terminal is less than the curtailed electrical power amount instructed by the output curtailment instruction based on the first reply from the first consumer terminal,
wherein the control circuit is configured to determine that the load adjustment is possible under a condition that a total amount of the adjustable electrical power amount of the first consumer terminal and the adjustable electrical power amount of the second consumer terminal is greater than the curtailed electrical power amount instructed by the output curtailment instruction,
wherein the distributed power source system includes a plurality of distributed power sources that includes at least a first distributed power source and a second distributed power source, and
wherein the control circuit is configured to determine that the load adjustment is possible under a condition that a total amount of the adjustable electrical power amount of the first consumer terminal and the adjustable electrical power amount of the second consumer terminal is greater than a total amount of the curtailed electrical power amount instructed by the output curtailment instruction from the first distributed power source and the curtailed electrical power amount instructed by the output curtailment instruction from the second distributed power source.

2. The adjustment control device according to claim 1, wherein the control circuit is configured to receive the output curtailment instruction from the distributed power source.

3. The adjustment control device according to claim 1, wherein the control circuit is configured to receive the output curtailment instruction from the command station.

4. The adjustment control device according to claim 1, wherein the control circuit is configured to determine the load adjustment is possible based on the reply, under a condition that an adjustable electrical power amount of the terminal of the consumer is greater than a curtailed electrical power amount instructed by the output curtailment instruction.

5. The adjustment control device according to claim 1, wherein the control circuit is configured to receive a second reply to the request from the second consumer terminal via the communication circuit,
wherein the control circuit is configured to notify to the distributed power source of the avoidance of the output curtailment instruction via the communication circuit under a condition that an adjustable electrical power amount of the second consumer terminal is greater than the curtailed electrical power amount instructed by the output curtailment instruction based on the second reply from the second consumer terminal.

6. The adjustment control device according to claim 1, wherein the control circuit is configured to determine an order of sending the request of the load adjustment among the plurality of consumer terminals based on the curtailed electrical power amount instructed by the output curtailment instruction.

7. A distributed power source system, comprising:
a distributed power source generating an electric power utilizing renewable energy;
a command station controlling an output of the distributed power system;
a consumer terminal controlling consumption of the electric power generated by the distributed power source; and
an adjustment control device that includes a control circuit configured to
receive an output curtailment instruction for the distributed power source,
automatically send a request of load adjustment to the consumer terminal in response to the output curtailment instruction without the need of an operator, the request of load adjustment including information of electrical power amount to be adjusted in association with the output curtailment instruction,
receive a reply to the request from the consumer terminal,
send notification of an avoidance of the output curtailment instruction to the distributed power source, in a case where the control circuit determines to perform the load adjustment, based on the reply from the consumer terminal,
send confirmation of the output curtailment instruction to the distributed power source in a case where the control circuit determines not to perform the load adjustment, based on the reply,
wherein the distributed power source is configured to perform an output curtailment in a case where the distributed power source receives the output curtailment instruction from the control circuit,
wherein the distributed power source is configured to keep generating the electric power utilizing renewable energy in a case where the distributed power source receives the avoidance of the output curtailment instruction from the control circuit,
wherein the distributed power source system includes a plurality of consumer terminals that includes at least a first consumer terminal and a second consumer terminal,
wherein the control circuit is configured to send the request of the load adjustment to the first consumer terminal in response to the output curtailment instruction,
wherein the control circuit is configured to receive a first reply to the request from the first consumer terminal,
wherein the control circuit is configured to send the request of the load adjustment to the second consumer terminal, under a condition that an adjustable electrical power amount of the first consumer terminal is less than the curtailed electrical power amount instructed by the output curtailment instruction based on the first reply from the first consumer terminal,
wherein the control circuit is configured to determine to operate the load adjustment under a condition that a total amount of the adjustable electrical power amount of the first consumer terminal and the adjustable electrical power amount of the second consumer terminal is greater than the curtailed electrical power amount instructed by the output curtailment instruction,
wherein the distributed power source system includes a plurality of distributed power sources that includes at least a first distributed power source and a second distributed power source, and
wherein the control circuit is configured to determine to operate the load adjustment under a condition that a total amount of the adjustable electrical power amount of the first consumer terminal and the adjustable electrical power amount of the second consumer terminal is greater than a total amount of the curtailed electrical power amount instructed by the output curtailment instruction from the first distributed power source and the curtailed electrical power amount instructed by the output curtailment instruction from the second distributed power source.

8. The distributed power source system according to claim 7, wherein the control circuit is configured to receive the output curtailment instruction from the distributed power source.

9. The distributed power source system according to claim 7, wherein the control circuit is configured to receive the output curtailment instruction from the command station.

10. The distributed power source system according to claim 7, wherein the control circuit is configured to determine whether to operate the load adjustment based on the reply, under a condition that an adjustable electrical power amount of the consumer terminal is greater than a curtailed electrical power amount instructed by the output curtailment instruction.

11. The distributed power source system according to claim 7,
wherein the control circuit is configured to receive a second reply to the request from the second consumer terminal,
wherein the control circuit is configured to notify to the distributed power source of the avoidance of the output curtailment instruction under a condition that an adjustable electrical power amount of the second consumer terminal is greater than the curtailed electrical power amount instructed by the output curtailment instruction based on the second reply from the second consumer terminal.

12. The distributed power source system according to claim 7,
wherein the control circuit is configured to determine an order of sending the request of the load adjustment among the plurality of consumer terminals based on the curtailed electrical power amount instructed by the output curtailment instruction.

* * * * *